United States Patent
Tseng

(10) Patent No.: US 10,281,350 B2
(45) Date of Patent: May 7, 2019

(54) PRESSURE SENSOR AND MANUFACTURE METHOD THEREOF

(71) Applicant: MiraMEMS Sensing Technology Co., Ltd., Suzhou (CN)

(72) Inventor: Li-Tien Tseng, Taoyuan (TW)

(73) Assignee: MIRAMEMS SENSING TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 15/678,822

(22) Filed: Aug. 16, 2017

(65) Prior Publication Data

US 2018/0052067 A1 Feb. 22, 2018

(30) Foreign Application Priority Data

Aug. 17, 2016 (CN) .......................... 2016 1 0679877

(51) Int. Cl.
*G01L 9/02* (2006.01)
*G01L 19/14* (2006.01)

(52) U.S. Cl.
CPC .............. *G01L 9/02* (2013.01); *G01L 19/141* (2013.01); *G01L 19/148* (2013.01)

(58) Field of Classification Search
CPC ........ G01L 19/141; G01L 19/148; G01L 9/02
See application file for complete search history.

(56) References Cited

U.S. PATENT DOCUMENTS

| | | | | |
|---|---|---|---|---|
| 6,109,113 A | * | 8/2000 | Chavan | G01L 9/0073 73/706 |
| 2012/0266684 A1 | * | 10/2012 | Hooper | G01L 9/0052 73/721 |
| 2017/0081174 A1 | * | 3/2017 | Liu | B81B 7/007 |
| 2017/0115322 A1 | * | 4/2017 | Li | G01P 15/125 |
| 2017/0190567 A1 | * | 7/2017 | Chen | B81B 1/004 |
| 2017/0248484 A1 | * | 8/2017 | Yotsuya | G01L 9/0042 |
| 2017/0336435 A1 | * | 11/2017 | Tseng | G01P 15/125 |

\* cited by examiner

*Primary Examiner* — Francis C Gray

(74) *Attorney, Agent, or Firm* — Muncy, Geissler, Olds & Lowe, P.C.

(57) ABSTRACT

A pressure sensor includes a bearing region and a frame which is spatially separated from the bearing region, wherein a sensing element of the pressure sensor is produced on the bearing region. When the aforementioned pressure sensor is mounted on a package substrate, the stress from the package substrate or a circuit board can be isolated by a space between the bearing region and the frame to avoid unexpected deformation on the sensing element.

24 Claims, 8 Drawing Sheets

PRESSURE SENSOR AND MANUFACTURE METHOD THEREOF

BACKGROUND OF THE INVENTION

1. Field of the Invention

The present invention relates to a pressure sensor and a manufacture method thereof, particularly to an MEMS-based pressure sensor and a manufacture method thereof.

2. Description of the Prior Art

The microelectromechanical system (MEMS) appeared in 1970s. So far, MEMS, which was originally an object explored in laboratories, has been evolved into an object integrated by a high-level system, extensively used in consumer electronics, and presenting an amazing stable growth. The MEMS device detects or controls the dynamic physical quantities of the moveable components thereinside to realize various functions.

For example, in an MEMS-based pressure sensor, the pressure difference between an airtight chamber and the external environment drives an MEMS component (such a thin film) to generate deformation, and the deformation is used to measure the pressure variation of the external environment. However, during the process of packaging an MEMS-based device or the process of sticking an MEMS-based device to a circuit board, stress may warp the package substrate or the circuit board. The warpage may hinder the thin film from generating the expected deformation and make the initial capacitance deviated from a preset value.

Therefore, how to avoid the problem that the warpage of the package substrate or circuit board causes the deformation of the MEMS components has been a challenge the manufacturers are eager to overcome.

SUMMARY OF THE INVENTION

The present invention proposes a pressure sensor and a manufacture method thereof, wherein a substrate is divided into a bearing region and a frame spatially separated from the bearing region, and wherein the sensing element is disposed in the bearing region. According to the structure, the frame is fixed to a package substrate, whereby the stress of the package substrate or circuit board can be isolated by the space between the frame and the bearing region to prevent the sensing element from generating unexpected deformation.

In one embodiment, the pressure sensor of the present invention comprises a first substrate and a second substrate. The first substrate includes a first surface, a second surface opposite to the first surface, and a circuit layer. The circuit layer is disposed on the second surface of the first substrate and further includes a first circuit, a second circuit, and a plurality of first electric-conduction contacts. The first substrate is divided into a bearing region, a frame spatially separated from the bearing region, and at least one connection arm connected with the bearing region and the frame. The first circuit and the second circuit are disposed in the bearing region. The second substrate includes a third surface and a fourth surface opposite to the third surface. The second substrate is disposed on the second surface of the first substrate with the third surface facing the first substrate. The second substrate is electrically connected with the plurality of first electric-conduction contacts. The second substrate also includes a sensing element and a reference part. The sensing element is disposed in the bearing region corresponding to the first circuit and cooperates with the first substrate to define an airtight chamber. The reference part is disposed in the bearing region corresponding to the second circuit. A specified spacing is maintained between the reference part of the second substrate and the second circuit.

In another embodiment, the method for manufacturing a pressure sensor comprises steps: providing a first substrate including a first surface, a second surface opposite to the first substrate, and a circuit layer disposed in the second surface of the first substrate and further including a first circuit, a second circuit and a plurality of first electric-conduction contacts; providing a second substrate including a third surface and a fourth surface opposite to the third surface; forming a first recess in the circuit layer or the third surface of the second substrate; joining the second substrate to the second surface of the first substrate with the third surface facing the first substrate to define an airtight chamber; electrically connecting the first substrate with the second substrate; patterning the second substrate to form a sensing element and a reference part, wherein the sensing element is corresponding to the first circuit and the reference part is corresponding to the second circuit, and wherein a specified spacing is maintained between the reference part and the second circuit; and patterning the first substrate to form a bearing region, a frame spatially separated from the bearing region, and at least one connection arm connected with the bearing region and the frame, wherein the first circuit and the second circuit are disposed in the bearing region.

Below, embodiments are described in detail in cooperation with attached drawings to make easily understood the objectives, technical contents, characteristics and accomplishments of the present invention.

DESCRIPTION OF THE PREFERRED EMBODIMENTS

Figure 1A:
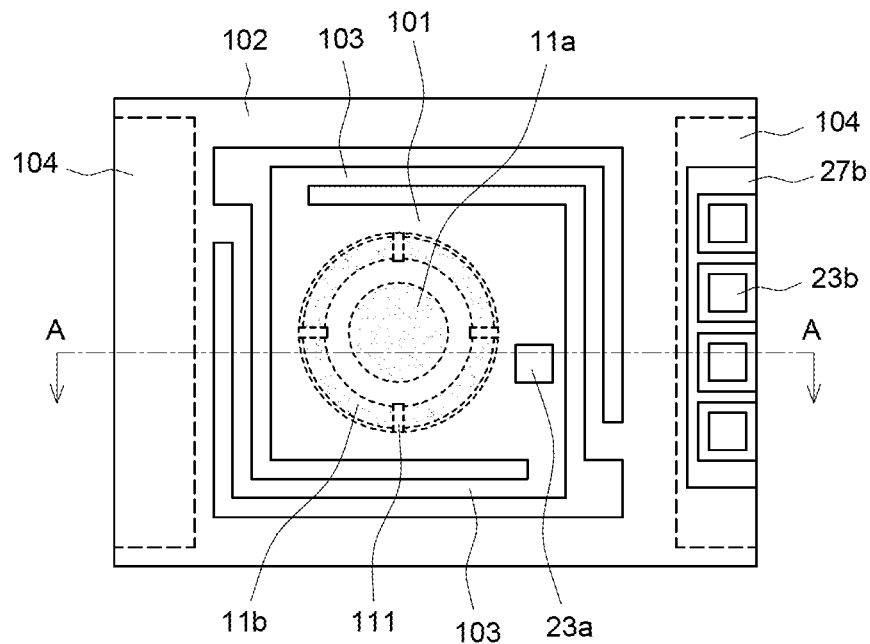
FIG. 1a is a top view schematically showing a pressure sensor according to a first embodiment of the present invention.

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Figure 1B:
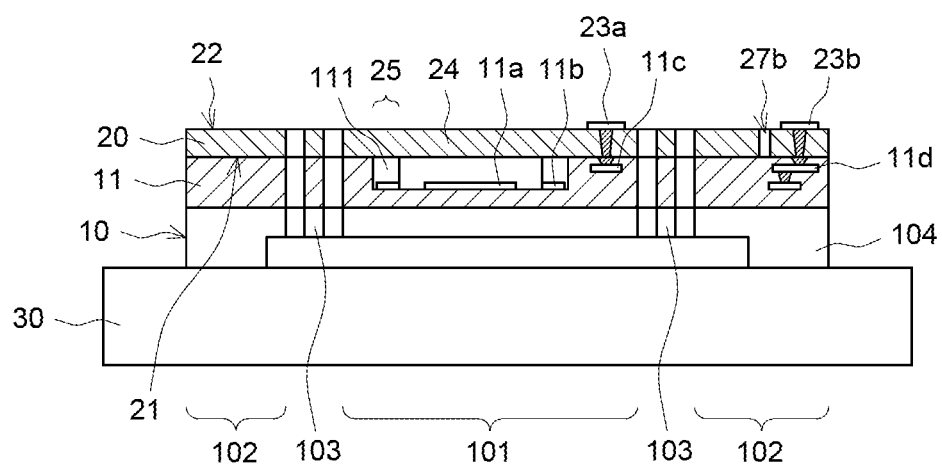
FIG. 1b is a sectional view taken along Line AA in FIG. 1a and schematically showing a pressure sensor according to the first embodiment of the present invention.

The present invention uses a MEMS-based device to realize a pressure sensor. Refer to FIG. 1a and FIG. 1b for a first embodiment of the present invention. In the first embodiment, the pressure sensor of the present invention comprises a first substrate 10 and a second substrate 20. The first substrate 10 includes a first surface, a second surface opposite to the first surface, and a circuit layer 11. In the first embodiment shown in FIG. 1b, the circuit layer 11 is disposed on the second surface (i.e. the upper surface) of the first substrate 10. According to the design of the first embodiment, the circuit layer 11 at least includes a metal layer; the exposed areas of the metal layer may respectively function as a first circuit 11a, a second circuit 11b, and a plurality of first electric-conduction contacts 11c and 11d. In one embodiment, the first substrate 10 is a glass substrate or a complementary metal oxide semiconductor (CMOS) substrate. The first substrate 10 is further divided into a bearing region 101, a frame 102, and a connection arm 103. The main structures of the MEMS device, such as the first circuit 11a and the second circuit 11b, are fabricated on the bearing region 101. The frame 102 is spatially separated from the bearing region 101 and surrounds the bearing region 101. The connection arm 103 is disposed between the bearing region 101 and the frame 102 to connect the bearing region 101 and the frame 102.

The second substrate 20 includes a third surface 21 and a fourth surface 22; the third surface 21 faces the second surface of the first substrate 10. In some embodiments, the joint of the first substrate 10 and the second substrate 20 is realized with at least one of a eutectic bonding method, a fusion boding method, a welding method and an adhesion method. The second substrate 20 is electrically connected with the plurality of first electric-conduction contacts 11c and 11d via electric-conduction structures 23a and 23b. The second substrate 20 includes a sensing element 24 and a reference part 25. The sensing element 24 is disposed in the bearing region 101 and cooperates with the first substrate 10 to define an airtight chamber. Thereby, the sensing element 24 can deform according to the external pressure. The sensing element 24 is opposite to the first circuit 11a to form a sensing capacitor. The reference part 25 of the second substrate 20 is also disposed in the bearing region 101 and opposite to the second circuit 11b. The distance between the reference part 25 and the second circuit 11b is maintained to have a fixed value. In other words, the spacing between the reference part 25 and the second circuit 11b would not vary with the change of the external pressure. Thus, the capacitor formed by the reference part 25 and the second circuit 11b has a fixed capacitance functioning as the reference capacitance. According to the difference between the sensed capacitance and the reference capacitance, the deformation of the sensing element 24 can be worked out.

Figure 7A:
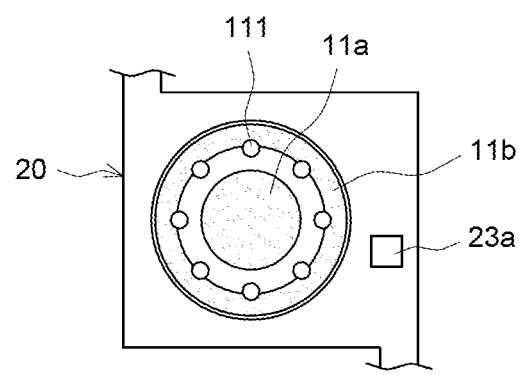
FIG. 7a is a top view schematically showing a local region of a pressure sensor according to a seventh embodiment of the present invention.
Figure 7B:
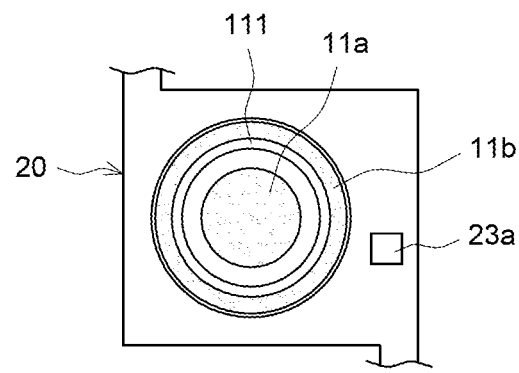
FIG. 7b is a top view schematically showing a local region of a pressure sensor according to an eighth embodiment of the present invention.
Figure 7C:
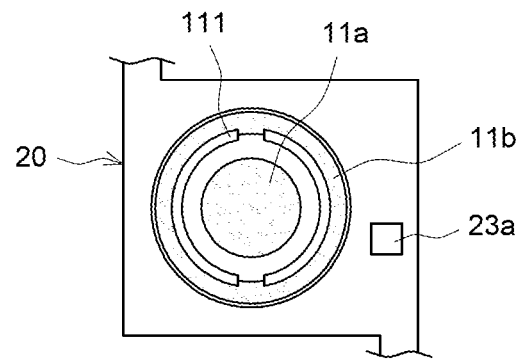
FIG. 7c is a top view schematically showing a local region of a pressure sensor according to a ninth embodiment of the present invention.

In one embodiment, the first circuit 11a is arranged at the geometrical center of the airtight chamber. It is easily understood: the sensing element 24 corresponding to the first circuit 11a can thereby generate a larger deformation with respect to the external pressure and achieve a higher sensitivity. The second circuit 11b is arranged near the side wall of the airtight chamber; the side wall supports the reference part 25 opposite to the second circuit 11b to maintain a fixed spacing between the reference part 25 and the second circuit 11b. In one embodiment, at least one support element 111 is disposed between the reference part 25 and the second circuit 11b so as to maintain a fixed spacing between the reference part 25 and the second circuit 11b. In the embodiment shown in FIG. 1a, the support element 111 is a wall-like structure. However, the present invention does not limit that the support element 111 must be a wall-like structure. In the present invention, the support element 111 may be a column-like structure (as shown in FIG. 7a), an annulus-like structure (as shown in FIG. 7b), an arc-like structure (as shown in FIG. 7c), or another structure.

Refer to FIG. 1b again. While the frame 102 of the first substrate 10 of the pressure sensor of the present invention is joined with a package substrate 30, the bearing region 101 containing the sensing element 24 is not fixed to the package substrate 30. Therefore, the stress of the package substrate 30 only acts on the frame 102. In other words, the stress of the package substrate 30 is isolated by the space between the bearing region 101 and the frame 102. Thus, the stress of the package substrate 30 would not cause the sensing element 24 to generate unexpected deformation. In one embodiment, at least one pillar 104 is arranged on the first surface of the frame 102 to form a gap between the bearing region 101 of the first substrate 10 and the package substrate 30, which is a further measure to prevent the stress of the package substrate 30 from causing unexpected deformation of the sensing element 24 in the bearing region 101.

Figure 5:
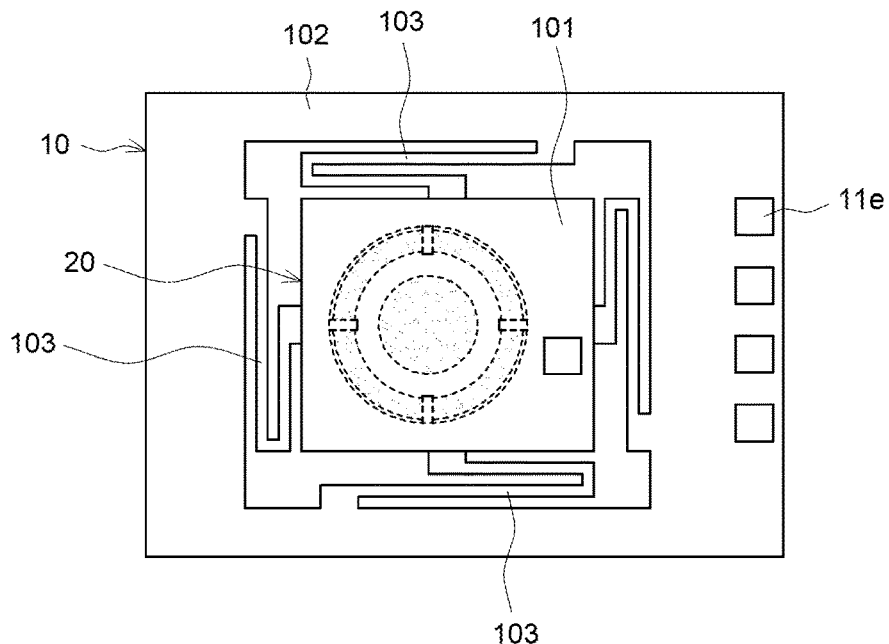
FIG. 5 is a top view schematically showing a pressure sensor according to a fifth embodiment of the present invention.
Figure 6:
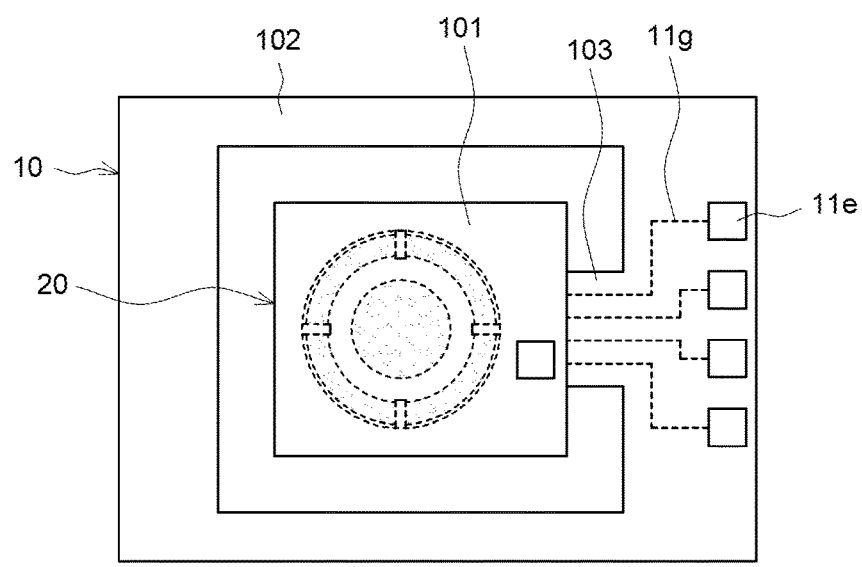
FIG. 6 is a top view schematically showing a pressure sensor according to a sixth embodiment of the present invention.

In one embodiment, there is a plurality of connection arms 103 each having at least one deflection portion. In the embodiment shown in FIG. 1a, the connection arms 103 are two L-shape structures disposed diagonally in the bearing region 101. While the stress of the package substrate 30 acts on the frame 102, the L-shape structures can deform to absorb the stress. Refer to FIG. 5. In one embodiment, the connection arms 103 are four U-shape structures. Similarly, the U-shape connection arms 103 can also deform to absorb the stress of the package substrate 30. Refer to FIG. 6. In one embodiment, the connection arm 103 is a single straight-strip structure connected with one side of the bearing region 101. As the other sides of the bearing region 101 are opened, the bearing region 101 would not be deformed by the stress of the package substrate 30.

Refer to FIG. 1a and FIG. 1b. In the embodiment shown in FIG. 1a and FIG. 1b, the electric-conduction structures 23a can function as the electric-conduction path between the sensing element 24 and the circuit layer 11. The electric-conduction structure 23b is disposed on a projection area of the fourth surface 22 of the second substrate 20, wherein the projection area is defined via projecting the frame 102 onto the fourth surface 22, and the electric-conduction structure 23b functions as a second electric-conduction contact to electrically connect with the external device. Thus, the sensing element 24 can be electrically connected with the external device through the electric-conduction structure 23a, the trace 11g (as shown in FIG. 6) of the circuit layer 11 and the electric-conduction structure 23b. It is easily understood: a plurality of trenches 27b may be formed in the second substrate 20 to make the plurality of electric-conduction structures 23b electrically independent.

Figure 2A:
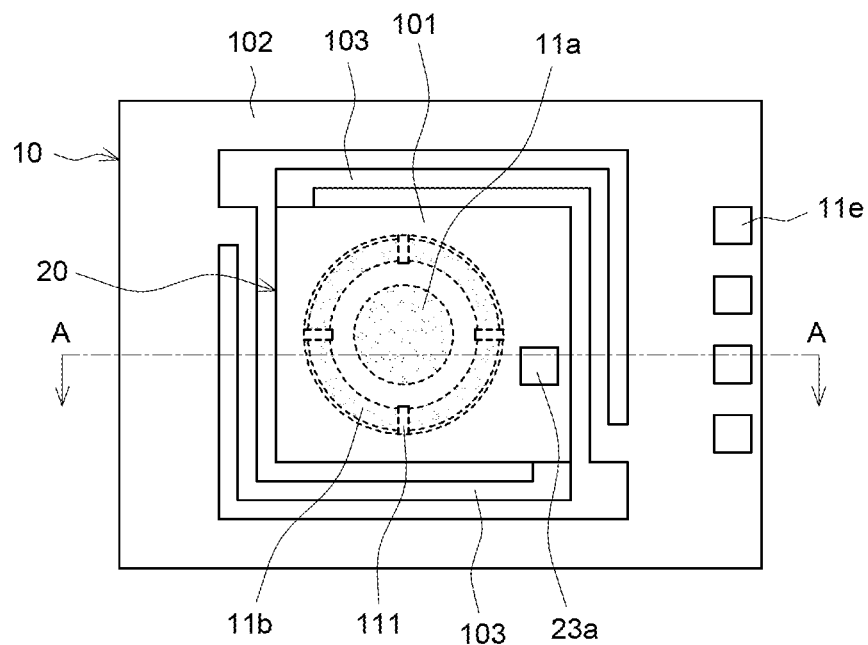
FIG. 2a is a top view schematically showing a pressure sensor according to a second embodiment of the present invention.
Figure 2B:
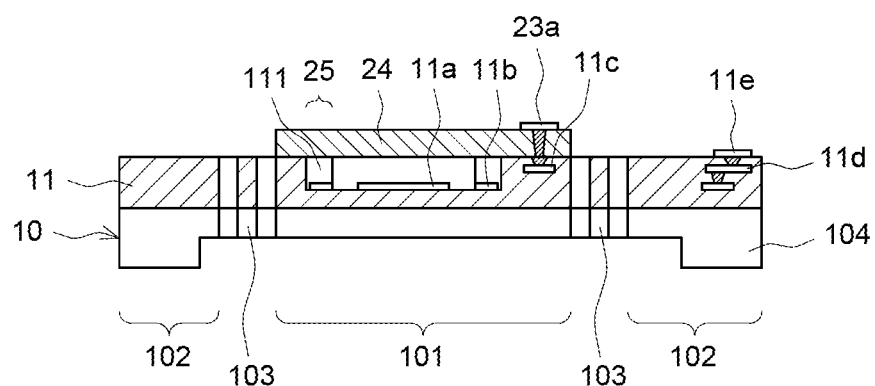
FIG. 2b is a sectional view taken along Line AA in FIG. 2a and schematically showing a pressure sensor according to the second embodiment of the present invention.

Refer to FIG. 2a and FIG. 2b. In one embodiment, the second substrate 20 is disposed only inside the bearing region 101. Thus, the second substrate 20 does not cover the first electric-conduction contact 11d, which is disposed in the frame 102. Then, the first electric-conduction contact 11d can directly function as the electric-conduction contact for external electric connection. In one embodiment, an electric-conduction structure 11e and the first electric-conduction contact 11d can be appropriately fabricated to function as the electric-conduction contact for external electric connection.

Figure 3:
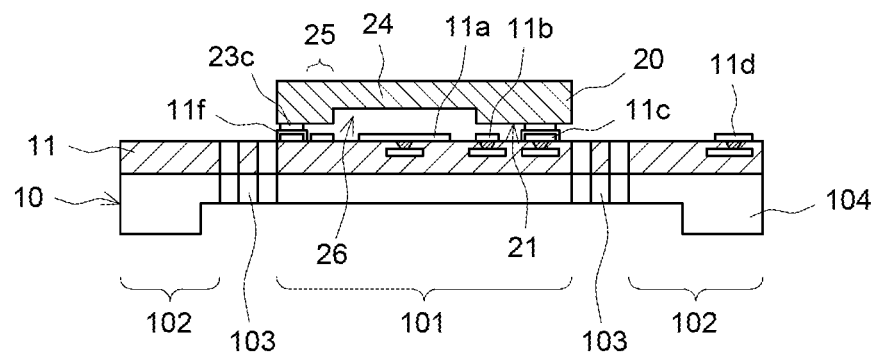
FIG. 3 is a sectional view schematically showing a pressure sensor according to a third embodiment of the present invention.
Figure 4:
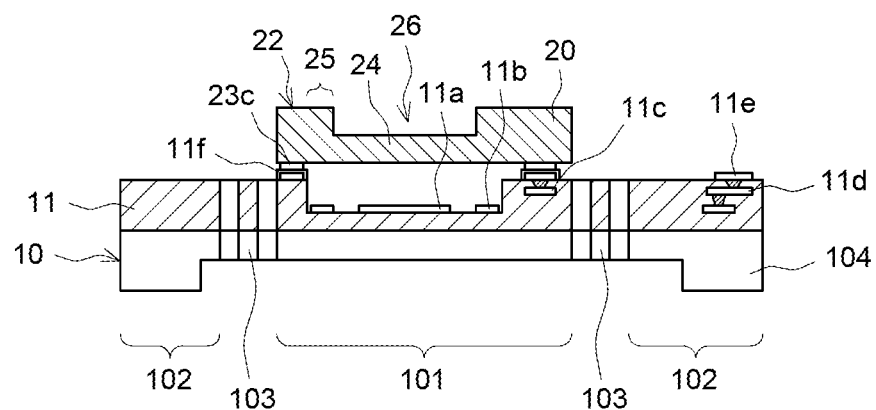
FIG. 4 is a sectional view schematically showing a pressure sensor according to a fourth embodiment of the present invention.

The thickness of the sensing element 24 and the distance between the sensing element 24 and the first circuit 11a can be realized in several appropriate methods. As shown in FIG. 1b and FIG. 2b, the second substrate 20 has a uniform thickness; the distance between the sensing element 24 and the first circuit 11a is defined by the removing a portion of the circuit layer 11. Refer to FIG. 3. In one embodiment, a recess 26 is formed on the third surface 21 of the second substrate 20 to form the sensing element 24 having an appropriate thickness and an appropriate distance between the sensing element 24 and the first circuit 11a. Refer to FIG. 4. In one embodiment, a recess 26 is formed on the fourth surface 22 of the second substrate 20 to form the sensing element 24 having an appropriate thickness; the distance between the sensing element 24 and the first circuit 11a is formed via removing a portion of the circuit layer 11. In the embodiments shown in FIG. 3 and FIG. 4, the first substrate 10 is joined to the second substrate 20 in a eutectic bonding method. Thus, the first substrate 10 can be electrically connected with the second substrate 20 and the first electric-conduction contact 11c of the circuit layer 11 with appropriate electric-conduction materials 11f and 23c.

Figure 8A:
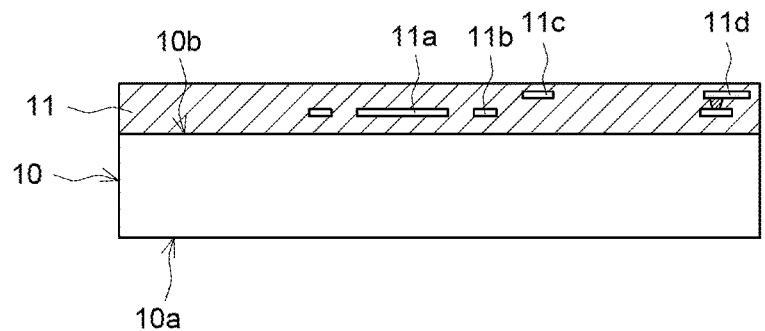
FIGS. 8a-8i are sectional views schematically showing a method for manufacturing a pressure sensor according to the first embodiment of the present invention.

Refer to FIGS. 8a-8j diagrams for demonstrating a method of manufacturing a pressure sensor according to one embodiment of the present invention. Firstly, provide a first substrate 10, which includes a first surface 10a, a second surface 10b opposite to the first surface 10a, and a circuit layer 11, as shown in FIG. 8a. The circuit layer 11 is disposed on the second surface 10b of the substrate 10. The circuit layer 11 further includes a first circuit 11a, a second circuit 11b and a plurality of first electric-conduction contacts 11c and 11d. The circuit layer 11 in FIG. 8a is a 1-dimensional pattern in the sectional view. However, the persons skilled in the art should understand that the circuit layer 11 is a 2-dimensional pattern having a special geometrical shape in fact. The fabrication method of the circuit layer 11 is a conventional technology well known by the persons skilled in the art. Therefore, it will not repeat herein. In some embodiments, the first substrate 10 is an arbitrary substrate having appropriate mechanical rigidity, such as a CMOS substrate or a glass substrate. Although only a single device is shown in these sectional views, it is easily understood: a plurality of chips can be disposed on a single substrate. The single device on these drawings is only for exemplification. The present invention does not limit that the method can only manufacture a single device. Thereinafter, the specification of the present invention will describe a wafer-level fabrication process to fabricate a plurality of chips on a substrate in detail. After a plurality of devices has been manufactured on a substrate, a dicing technology and a singulation technology are used to produce single devices. Then, the single devices are packaged for application.

Figure 8B:
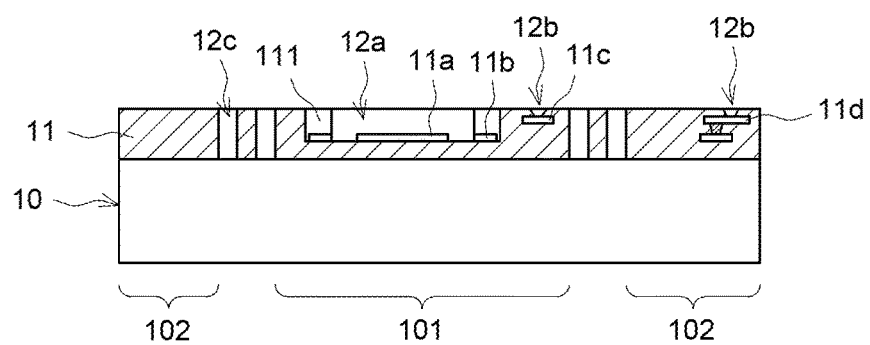

Next, form a first recess 12a in the circuit layer 11 of the first substrate 10 to reveal the first circuit 11a and the second circuit 11b, as shown in FIG. 8b. The formation of the first recess 12a can be realized with a photolithographic technology and an etching technology. In the photolithographic process, the dimensions of the mask are strictly controlled and fabricated with an appropriate material able to resist any etching process. In one embodiment, the mask is made of silicon nitride ($Si_3N_4$). The etching process includes one or more etching steps, such as an anisotropic etching step, an oxide etching step, a reactive ion etching (RIE) step, etc. It is easily understood: a portion of the circuit layer 11 can be preserved in the first recess 12a to function as a support element 111. In one embodiment, a recess 12b is simultaneously formed in the step to reveal the first electric-conduction contacts 11c and 11d. In one embodiment, a recess 12c is also formed in the step to reveal the second surface 10b of the first substrate 10 and pattern the circuit layer 11. The patterned circuit layer 11 is corresponding to a bearing region 101, a frame 102 and a connection arm 103 to be formed on the first substrate 10 in the succeeding steps. In one embodiment, the circuit layer 11 is not patterned in this step but patterned together with the first substrate 10 in the succeeding step.

Figure 8C:
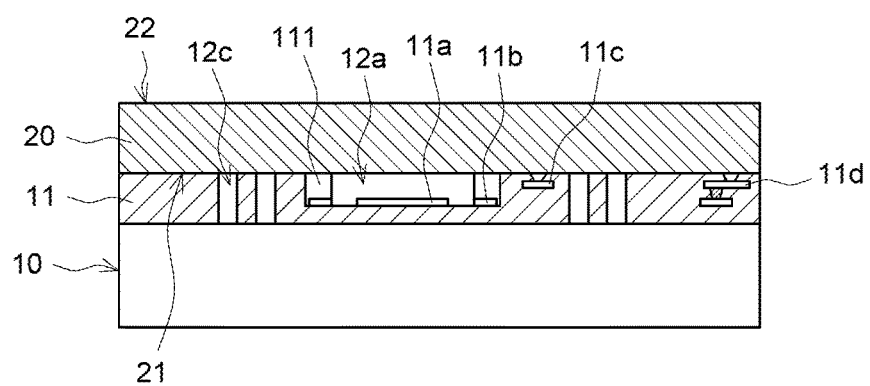

Next, provide a second substrate 20, which includes a third surface 21 and a fourth substrate 22 opposite to the third surface 21. The third surface 21 of the second substrate 20 is faced to and joined with the second surface 10b of the first substrate 10 to define an airtight chamber, i.e. enclose the first recess 12a, as shown in FIG. 8c. In some embodiments, the joint of the first substrate 10 and the second substrate 20 is realized with at least one of a eutectic bonding method, a fusion boding method, a welding method and an adhesion method. It should be noted: the steps shown in FIG. 8b and FIG. 8c can be modified to meet the designs of different MEMS devices. For example, while the MEMS device in FIG. 3 is to be fabricated, the first recess 12a needn't be formed in the circuit layer 11; however, the recess 26 is formed in the third surface 21 of the second substrate 20.

Figure 8D:
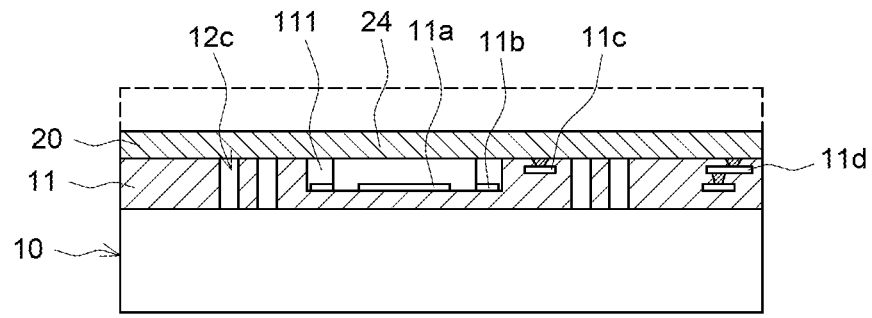

Next, use a grinding process or another thinning process to thin the second substrate 20 to have the designated thickness, as shown in FIG. 8d. In some embodiments, the thinned second substrate 20 has a residual thickness of 5-30 μm, whereby the sensing element 24 can deform with pressure variation. The designated thickness can be realized with a conventional chemical-mechanical polishing (CMP) technology or a RIE technology. In the embodiment shown in FIG. 8d, as no structure functions as the retard layer to terminate the thinning process, the thinning process adopts precision control. If the precision control is not used, the thinning process may generate a second substrate 20 having a thickness smaller or larger than the designated thickness, which will affect the performance of the MEMS device. In some embodiments, an etching-retard layer is integrated with the second substrate 20 to facilitate the precision control of the thinning process. The persons skilled in the art should be able to recognize the modifications, variations, and substitutions of the embodiments of the present invention.

Figure 8E:
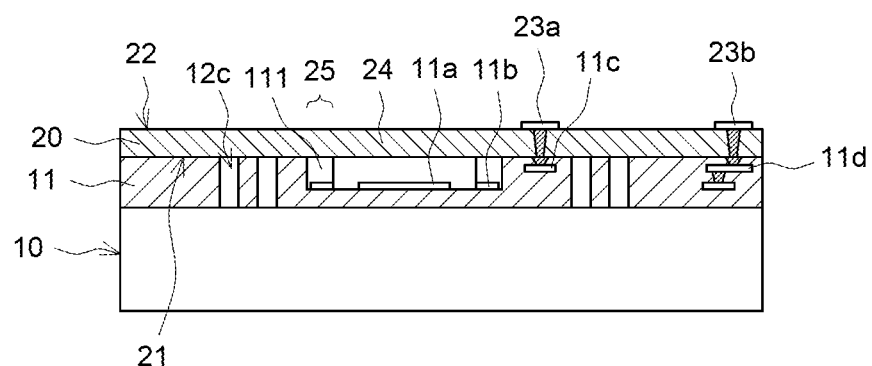

Next, electrically connect the first substrate 10 with the second substrate 20. In one embodiment, electric-conduction structures 23a and 23b are formed in the second substrate 20 for electric connection with the first electric-conduction contacts 11c and 11d of the circuit layer 11, as shown in FIG. 8e. In some embodiments, a photolithographic process and an etching process are use to form through-holes penetrating the third surface 21 and the fourth surface 22 of the second substrate 20 and revealing the first electric-conduction contacts 11c and 11d of the circuit layer 11. Next, an electric-conduction material, such as tungsten, is filled into the through-holes. Then, the electric-conduction layers are disposed on the fourth surface 22 of the second substrate 20, cooperating with the electric-conduction material of the through holes to form electric-conduction structures 23a and 23b electrically connected with the circuit layer 11.

Figure 8F:
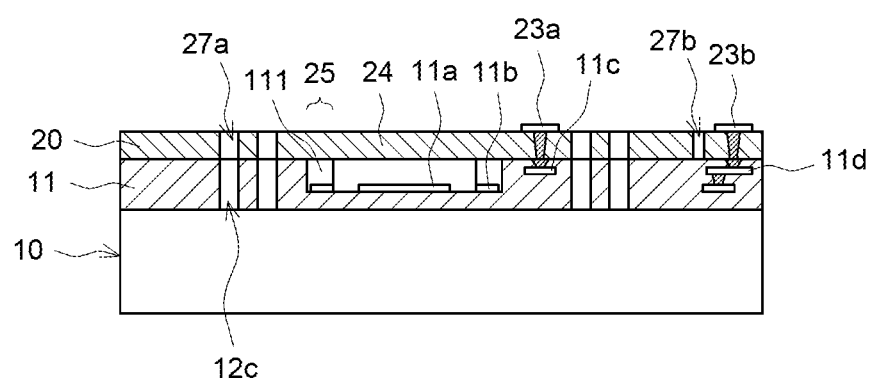

Next, use a photolithographic process and an etching process to pattern the second substrate 20 and define a sensing element 24 and a reference part 25 of the second substrate 20, wherein the sensing element 24 is corresponding to the first circuit 11a of the circuit layer 11, and the reference part element 25 is corresponding to the second circuit 11b of the circuit layer 11, as shown in FIG. 8f. In one embodiment, a photolithographic process and an etching process are used to form at least one trench 27a in the second substrate 20 to define the sensing element 24 and the reference part 25. Further, at least one trench 27b is formed on the second substrate 20 to make the plurality of electric-conduction structures 23b electrically independent. In the embodiment shown in FIG. 8f, the trench 27a is corresponding to the recess 12c of the circuit layer 11. It is easily understood: while the MEMS device in FIG. 2b is to be fabricated, most of the second substrate 20 is removed, and only the second substrate 20 inside the bearing region 101 is preserved.

Figure 8G:
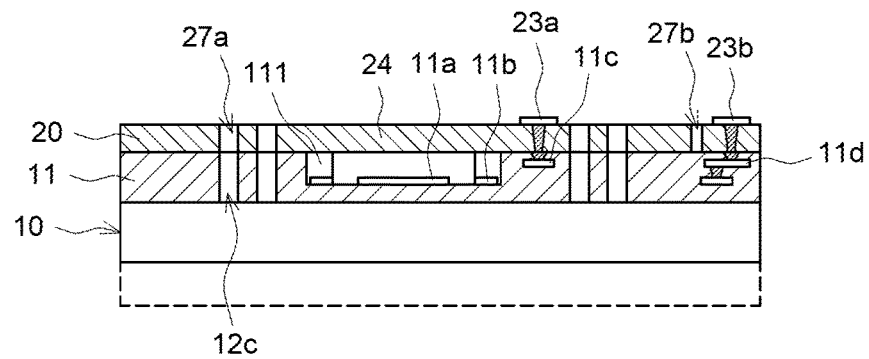

Next, use a grinding process or another thinning process to thin the first substrate 10 to have the designated thickness, as shown in FIG. 8g. In one embodiment, the thinned first substrate 10 has a thickness of 500 μm.

Figure 8H:
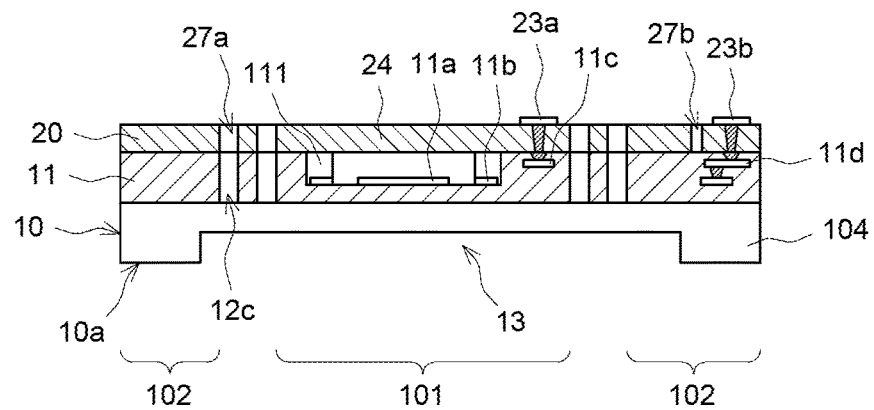

Next, use a photolithographic process and an etching process to form a second recess 13 in the first surface 10a of the first substrate 10 so as to generate altitude difference in first surface 10a of the first substrate 10, as shown in FIG. 8h. The position of the second recess 13 is corresponding to the position of the bearing region 101, whereby the bearing region 101 has a smaller thickness. The portion of the first substrate 10, which has a larger thickness, may function as a pillar 104, and the pillar 104 is inside the area of the frame 102. It should be noted: in some embodiments, the step shown in FIG. 8h is omitted. In such a case, no altitude difference exists between the bearing region 101 and the frame 102.

Figure 8I:
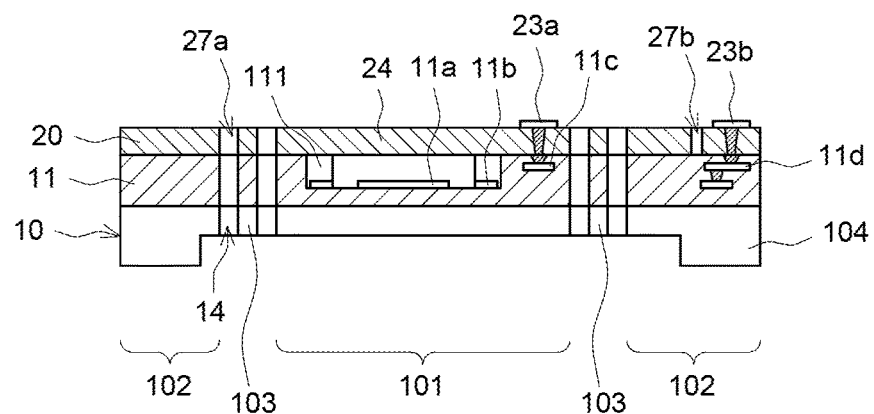

Then, use a photolithographic process and an etching process to form trenches 14 so as to pattern the first substrate 10. The patterned first substrate 10 is divided into the bearing region 101, the frame 102 and the connection arm 103, wherein the first circuit 11a and the second circuit 11b are arranged inside the bearing region 101, as shown in FIG. 8i. It is easily understood: the sensing element 24 and the reference part 25, which are respectively corresponding to the first circuit 11a and the second circuit 11b, are also disposed inside the bearing region 101. The method for manufacturing a pressure sensor of the present invention further comprises a step: joining the first surface 10a of the frame 102 of the first substrate 10 onto a package substrate 30 to form the structure shown in FIG. 1b. It should be noted: all the embodiments shown in from FIG. 1a to FIG. 7c can be realized via modifying the abovementioned manufacture process. The modification of the abovementioned process will not repeat herein.

In conclusion, the pressure sensor and the manufacture method thereof are characterized in dividing the substrate into a bearing region and a frame spatially separated from the bearing region and fabricating the sensing element in the bearing region. In packaging the pressure sensor, the frame is fixed to the package substrate with the bearing region not contacting the package substrate. Thus, the stress of the package substrate or circuit board is isolated by the space between the frame and the bearing region. Thereby is avoided the unexpected deformation of the sensing element. Preferably, a gap is formed between the bearing region and the package substrate to further enhance the effect of isolating the stress of the package substrate or circuit board.

What is claimed is:

1. A pressure sensor comprising:
   a first substrate including a first surface, a second surface opposite to the first surface, and a circuit layer disposed on the second surface of the first substrate and further including a first circuit, a second circuit, and a plurality of first electric-conduction contacts, wherein the first substrate is divided into a bearing region, a frame spatially separated from the bearing region, and at least one connection arm connected with the bearing region and the frame, and wherein the first circuit and the second circuit are disposed in the bearing region; and
   a second substrate disposed on the first substrate, the second substrate including a third surface facing the second surface of the first substrate and a fourth surface opposite to the third surface, and the second substrate electrically connected with the plurality of the first electric-conduction contacts, wherein the second substrate also includes
      a sensing element disposed in the bearing region corresponding to the first circuit and cooperating with the first substrate to define an airtight chamber between the first substrate and the second substrate; and
      a reference part disposed in the bearing region corresponding to the second circuit, wherein a specified spacing is maintained between the reference part and the second circuit.

2. The pressure sensor according to claim 1, wherein at least a portion of the first electric-conduction contacts are disposed in the frame to function as electric-conduction contacts electrically connected with external devices.

3. The pressure sensor according to claim 1, wherein the second substrate further includes a plurality of second electric-conduction contacts disposed inside a projection area of the fourth surface of the second substrate, wherein the projection area is defined via projecting the frame onto the fourth surface, and the second electric-conduction contacts are electrically connected with the first electric-conduction contacts to function as electric-conduction contacts electrically connected with external devices.

4. The pressure sensor according to claim 1, wherein the connection arm is single and with a straight strip-like shape.

5. The pressure sensor according to claim 1, wherein the connection arms are plural and each of the connection arm is with at least one deflection portion.

6. The pressure sensor according to claim 1, wherein a support element is disposed between the reference part and the second circuit.

7. The pressure sensor according to claim 6, wherein the support element is a wall-like, column-like, annulus-like, or arc-like structure.

8. The pressure sensor according to claim 1, wherein the first circuit is disposed at a geometrical center of the airtight chamber.

9. The pressure sensor according to claim 1, wherein the second circuit is disposed near a side wall of the airtight chamber.

10. The pressure sensor according to claim 1, further comprising:
a package substrate, wherein the first substrate is joined to the package substrate with the first surface of the frame.

11. The pressure sensor according to claim 10, wherein a gap is formed between the bearing region of the first substrate and the package substrate.

12. A method for manufacturing a pressure sensor, comprising:
providing a first substrate including a first surface, a second surface opposite to the first substrate, and a circuit layer disposed in the second surface of the first substrate and further including a first circuit, a second circuit and a plurality of first electric-conduction contacts;
providing a second substrate including a third surface and a fourth surface opposite to the third surface;
forming a first recess in the circuit layer or the third surface of the second substrate;
joining the second substrate to the first substrate, wherein the third surface of the second substrate is facing the second surface of the first substrate to define an airtight chamber between the first substrate and the second substrate;
electrically connecting the first substrate with the second substrate;
patterning the second substrate to form a sensing element and a reference part of the second substrate, wherein the sensing element is corresponding to the first circuit and the reference part is corresponding to the second circuit, and wherein a specified spacing is maintained between the reference part and the second circuit; and
patterning the first substrate to form a bearing region, a frame spatially separated from the bearing region, and at least one connection arm connected with the bearing region and the frame, wherein the first circuit and the second circuit are disposed in the bearing region.

13. The method for manufacturing a pressure sensor according to claim 12, wherein at least a portion of the first electric-conduction contacts are disposed in the frame, and wherein patterning the second substrate reveals the first electric-conduction contacts in the frame.

14. The method for manufacturing a pressure sensor according to claim 12, wherein in the step of electrically connecting the first substrate with the second substrate, a plurality of second electric-conduction contacts is formed inside a projection area of the fourth surface of the second substrate, wherein the projection area is defined via projecting the frame onto the fourth surface; and the second electric-conduction contacts are electrically connected with the first electric-conduction contacts.

15. The method for manufacturing a pressure sensor according to claim 12, wherein the connection arm is single and with a straight strip-like shape.

16. The method for manufacturing a pressure sensor according to claim 12, wherein the connection arms are plural and each of the connection arm is with at least one deflection portion.

17. The method for manufacturing a pressure sensor according to claim 12, wherein a support element is disposed between the reference part and the second circuit.

18. The method for manufacturing a pressure sensor according to claim 17, wherein the support element is a wall-like, column-like, annulus-like, or arc-like structure.

19. The method for manufacturing a pressure sensor according to claim 12, wherein the first circuit is disposed at a geometrical center of the airtight chamber.

20. The method for manufacturing a pressure sensor according to claim 12, wherein the second circuit is disposed near a side wall of the airtight chamber.

21. The method for manufacturing a pressure sensor according to claim 12 further comprising a step:
patterning the circuit layer to reveal the first substrate before the first substrate is joined to the second substrate.

22. The method for manufacturing a pressure sensor according to claim 12 further comprising a step:
thinning the second substrate after the first substrate is joined to the second substrate.

23. The method for manufacturing a pressure sensor according to claim 12 further comprising:
forming a second recess in the first surface of the first substrate corresponding to the bearing region before the first substrate is patterned.

24. The method for manufacturing a pressure sensor according to claim 12 further comprising a step:
joining the first substrate to a package substrate with the first surface of the frame.

* * * * *